United States Patent [19]

Jensen

[11] Patent Number: 4,492,272

[45] Date of Patent: Jan. 8, 1985

[54] TILLAGE IMPLEMENT AND IMPROVED GANG ASSEMBLY THEREFOR

[75] Inventor: Thomas C. Jensen, Ankeny, Iowa

[73] Assignee: Deere & Company, Moline, Ill.

[21] Appl. No.: 358,121

[22] Filed: Mar. 15, 1982

[51] Int. Cl.³ .................. A01B 35/18; A01B 63/22
[52] U.S. Cl. ..................... 172/178; 172/611; 172/572; 172/328; 172/776
[58] Field of Search ............ 172/572, 710, 570, 178, 172/573, 611, 146, 196, 776

[56] References Cited

U.S. PATENT DOCUMENTS

| 3,225,839 | 12/1965 | Petitt | 172/146 X |
|---|---|---|---|
| 3,480,294 | 11/1969 | Lichti | 172/611 X |
| 3,481,408 | 12/1969 | Twidale | 172/311 |
| 3,700,039 | 10/1972 | Essex et al. | 172/265 |
| 3,706,345 | 12/1972 | Patterson | 172/572 |
| 4,066,132 | 1/1978 | Rehn | 172/572 |
| 4,078,615 | 3/1978 | Kelly | 172/711 |
| 4,245,706 | 1/1981 | Dietrich | 172/196 |
| 4,313,503 | 2/1982 | Good | 172/178 |
| 4,333,535 | 6/1982 | Hentrich | 172/572 |
| 4,396,070 | 8/1983 | Brandner | 172/572 |

FOREIGN PATENT DOCUMENTS

| 28081 | 7/1930 | Australia | 172/572 |
|---|---|---|---|
| 12278 | 2/1977 | Australia | 172/572 |
| 913445 | 10/1972 | Canada | 172/572 |

OTHER PUBLICATIONS

Binkley Wilbeck, Advertising Brochure of the Binkley Co., Warrenton Mo., 10/79.
Sunflower Trash Mulchers Models 4210 and 4230, Sunflower Manufacturing Co., Inc. Drawer 628, Beloit, KS 67420, Brochure 5M 1/81.
Wil-Rich Coulter Chisel Plow Brochure CCP/8-80/10M, Wil-Rich, Inc., Box 1013, Wahpeton, ND 58075.
Noble 7-9-11 Shank Chop n'Chisel, Royal Industries, Inc., 515 North Sixteenth St., Sac City, IA 50583, Form No. 2651.00.
Glencoe Soil Finisher, Portable Elevator, 920 E. Grove St., Bloomington, IL 61701, Brochure SF-976-50M.
Kent DiscOvator, Brochure.
Tillager, Lilliston Corporation, 7600 Series Brochure.

Primary Examiner—Richard J. Johnson

[57] ABSTRACT

A mulch tiller or similar implement having a rigid frame supporting a plurality of forward trash-sizing gang assemblies and rearward plow tools. Spring brackets rockably support the gang asemblies for independent vertical movement with respect to the frame and maintain a generally constant down pressure of the gangs against the soil. The frame includes diagonal beam structure and a lower subframe assembly for compact shipping, good draft load distribution and underframe clearance. Common depth control, main frame and hitch components are utilized for implements of varying widths to reduce cost.

45 Claims, 15 Drawing Figures

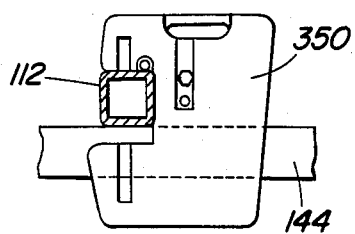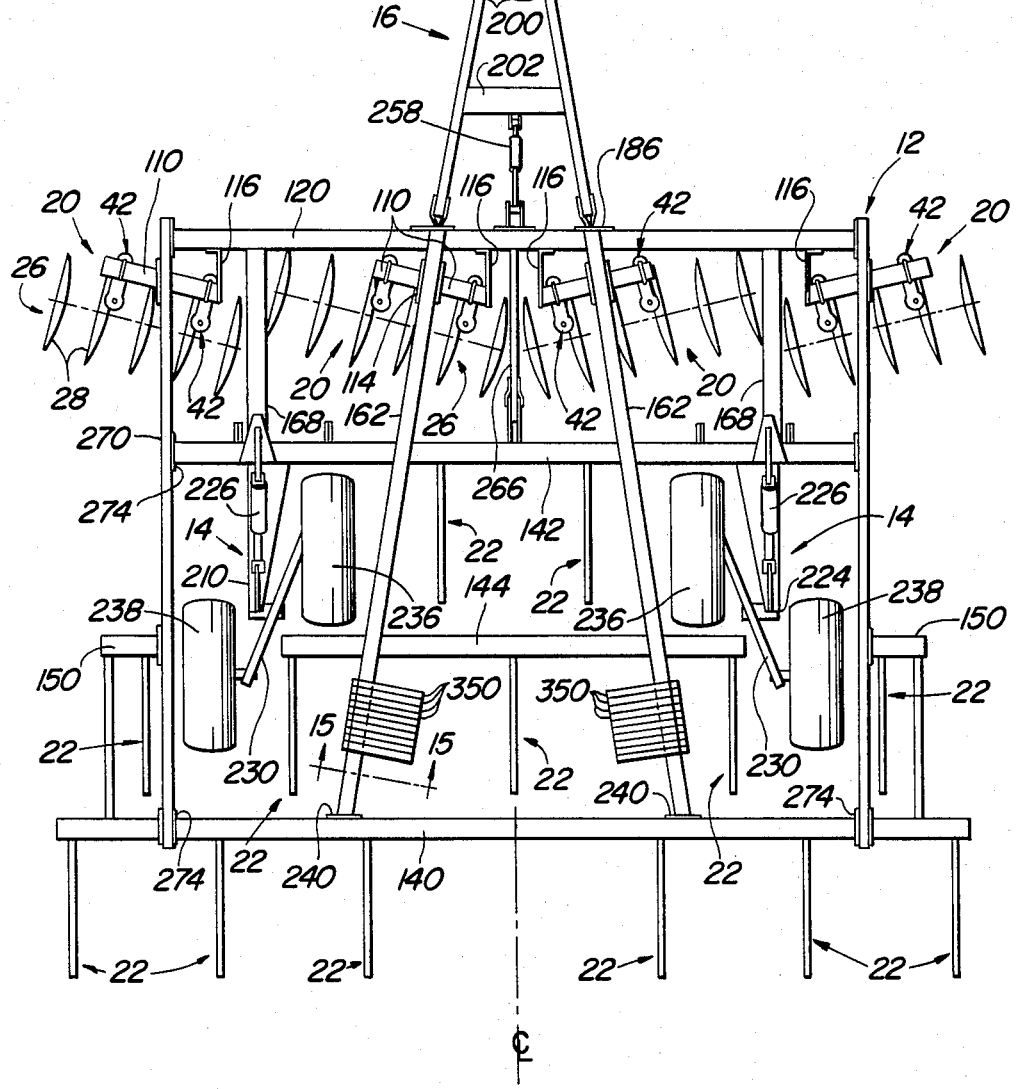

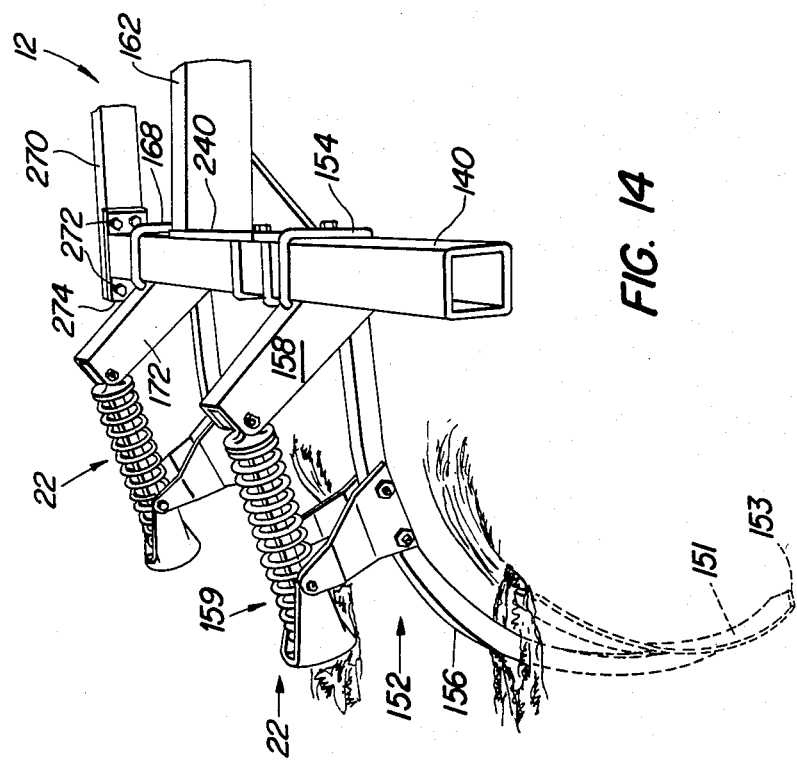
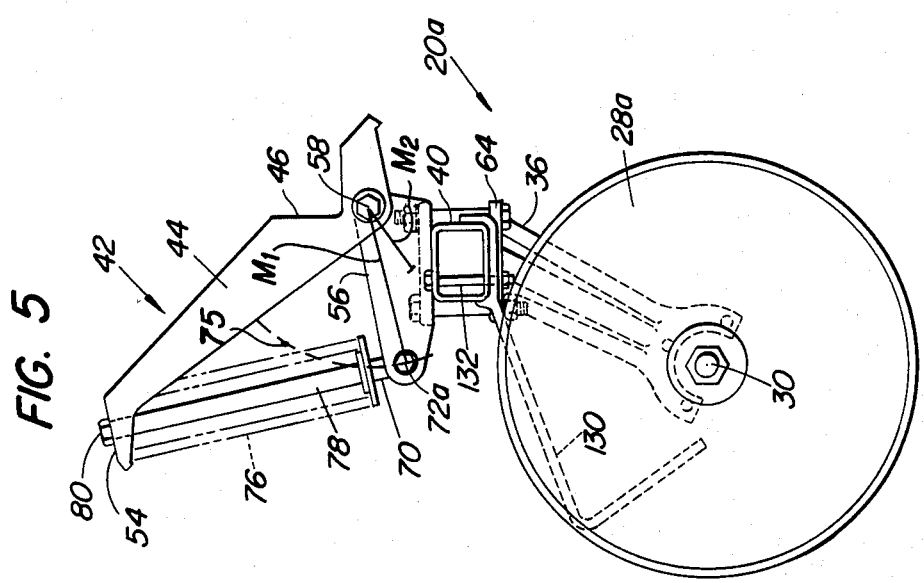

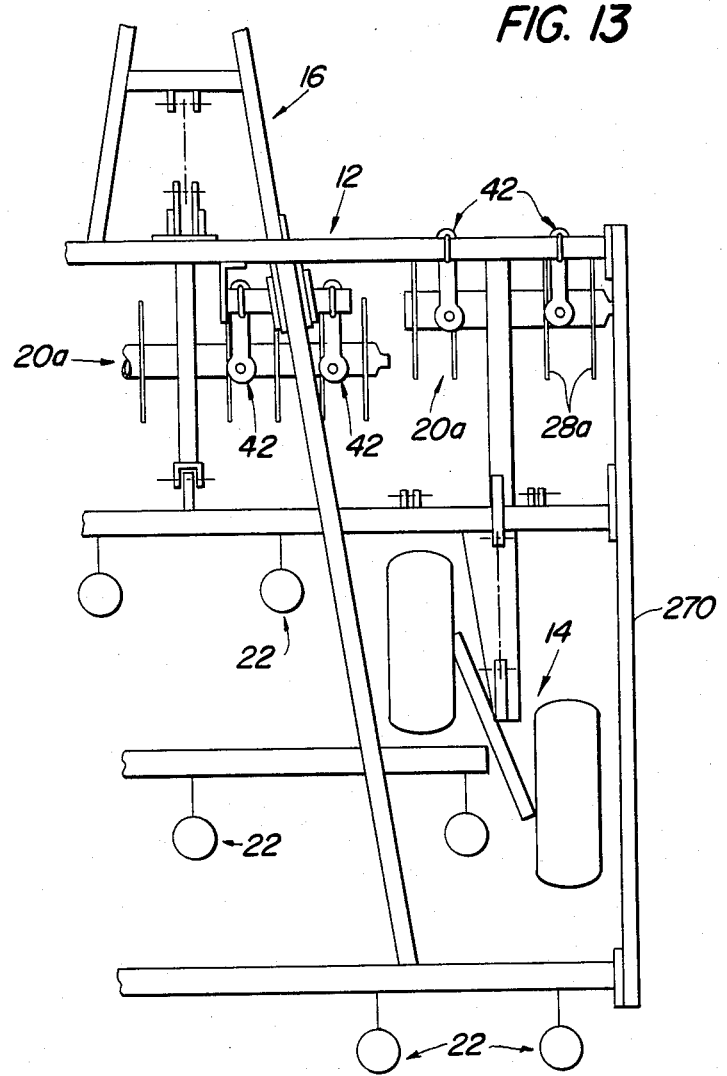

TILLAGE IMPLEMENT AND IMPROVED GANG ASSEMBLY THEREFOR

BACKGROUND OF THE INVENTION

The present invention relates generally to a tillage implement and more specifically to a tillage implement with disk or coulter gang assemblies.

Tillage implements having both forward disk or coulter gang assemblies and rearward plow tools such as twisted shovels or cultivator sweeps are commonly used in stubble-mulch and deep fallow tillage operations. Disk or coulter blades cut the stubble or stalks and trash ahead of the plow tools, and the plow tools rip down through the plow-soil layer to open the soil so air and water can get in. Such implements leave the surface of the soil open and blended with residues that protect the topsoil. The residues decompose faster into humus, and thereby create drought resistance and stronger crop root growth the following year. The soil surface is left moderately ridgy to give moisture a chance to soak in rather than run off. Wind erosion is kept to a minimum by the crop residue and the ridges left by the plow tools. The commercially available John Deere 1710 Mulch Tiller is an example of such a tillage implement.

A typical mulch tiller or similar type implement includes disk or coulter gang assemblies which are supported at the forward end of a main frame assembly. Tool-carrying shank assemblies are mounted at the rearward portion of the main frame. Changing the relative depth of the gangs and the standard assemblies required changing the relative height of the front and rear portions of the frame. In addition, a leveling adjustment is required on the front hitch assembly to maintain the proper attitude of the entire frame assembly both in the transport and in the field-working positions.

The gangs on the aforementioned implements are either mounted relatively ridgidly with respect to the frame assembly or else are mounted with spring assemblies providing a short tripping distance with the downward force exerted by the trip assemblies increasing significantly as the gangs move upwardly and closer to the frame. Such gang mounting arrangements result in uneven penetration of the disks or coulters, and when rough terrain or obstacles are encountered, upward movement of the gangs can actually lift the frame or remove a significant portion of the weight from the frame so that the rear tools do not penetrate to the desired level. The previous implements are difficult to balance, that is, to provide a nearly constant down force both at the rear and front portions of the frame in varying soil conditions and terrain. The relative inflexibility of the gangs results in the individual blades or coulters supporting a disproportionate amount of the implement weight. It is not uncommon for disks or coulters or gang bearings to break. The front portion of the frame often has to be adjusted with respect to the rear portion to maintain both the proper cutting action of the disks or coulters and to maintain the proper penetrating depth of the earth-working tools as soil conditions change. With the previous implement designs which utilize a main frame assembly with relatively adjustable front and rear portions, wide implements could not be practically designed since the adjustable frame portions cannot easily accommodate pivotally connected outrigger sections.

It is therefore an object of the present invention to provide a tillage implement with improved trash-sizing and soil-penetrating characteristics in various soil conditions and terrain. It is a further object to provide such an implement which has improved trash and soil flow for better incorporation.

It is a further object to provide a tillage implement with forward trash-sizing gangs and rearward earth-working tools wherein the weight of the total implement is properly distributed on both the gangs and the rear tools, even in rough terrain and varying soil conditions. It is another object to provide such an implement utilizing forward coulter or disk gang assemblies rockably mounted on the frame which provide reliable trash sizing relatively independently of the distance between the frame and the surface of the soil.

It is another object of the invention to provide a disk or coulter gang assembly wherein the gang is spring loaded downwardly and can trip up over obstacles, and wherein a relatively constant level downward force is maintained regardless of the trip position of the gang. It is another object to provide a disk or coulter gang assembly which can accommodate rough terrain or variations in soil conditions better than previously available gangs, and which provides a reduced incidence of breakage in the gang assembly.

It is still another object of the present invention to provide a tillage implement which can accommodate either straight coulter or angled disk gangs of various widths, but which still utilizes a standard main frame, depth control, and hitch assembly to reduce manufacturing costs and permit convenient modification of the working width of the implement.

It is yet another object of the present invention to provide a trash-sizing and soil-penetrating implement which includes disk or coulter gang assemblies, wherein the implement has a main frame which easily accommodates added weights without significantly affecting the down pressure on the gangs and without significantly reducing underframe clearance.

It is another object of the invention to provide an improved frame assembly for a multiple-tool tillage implement. It is a further object to provide such a frame with diagonal structure in line with the forward hitch to provide a strong backbone for the implement while at the same time maintaining good underframe clearance.

It is still another object of the invention to provide an improved tillage implement with trash-sizing and soil-penetrating tools wherein lift and leveling linkages are maintained substantially below the level of the main frame.

It is yet a further object of the invention to provide a compact, stable trash-sizing and soil-penetrating implement which uses a single main frame and which requires fewer leveling adjustments than at least some of the previously available implements.

It is another object to provide such an implement with an improved frame which is easier to package for shipment and to assemble than previously available frames.

In accordance with the above objects, a rectangular, substantially rigid main frame assembly includes a forward portion supporting a plurality of transversely spaced disk or coulter gang assemblies. Each assembly includes at least two spring trip bracket units connected to the frame and supporting a generally transverse gang tube. Standards extend downwardly and rearwardly from the gang tube and terminate in disk gang bearings which rotatably support the disk or coulter gang. The spring bracket permits the gang tube to be torqued upwardly as forces act against the disks or coulters. The geometry of the spring bracket provides a relatively constant trip force between the lowermost and uppermost positions of the disk gang therefore making the down pressure on the gang relatively independent of the distance between the main frame and the top of the soil. The spring brackets may be connected directly to the front transverse bar of the main frame when a transverse arrangement of coulters is utilized. Alternatively, stub-bars can be bolted to the fore-and-aft components of the main frame to support individual disk gangs at an angle, preferably approximately fourteen degrees from the transverse direction.

The rear portion of the frame supports a plurality of transversely spaced heavy-duty spring trip shank assemblies carrying deep penetration tillage tools. The standards have a high initial trip force level, and the level first increases as the standard trips upwardly. After reaching an intermediate tripped position, the trip force begins decreasing to permit large obstacles to be cleared. The initial increase in trip force provides for positive reentry of the earth-working tool. Concave twisted shovels are provided on the spring trip shank assemblies for improved soil flow and trash incorporation. The individual tripping action coupled with the level trip force curve of the gang assemblies provide a substantially uniform and properly distributed down force on both the disks or coulters and the earth-working tools to properly size trash and to maintain constant deep soil penetration of the shovels, even in rough terrain or where obstacles are encountered.

The frame includes upper diagonal beam structure and a lower weldment which can be compactly packaged for shipment and easily assembled. Good ground clearance is provided beneath the frame. The lift assembly and leveling linkages are primarily contained below the top of the frame for a neater appearance and for more positive depth adjusting action. The upper diagonal beam structure forms a natural extension of the forward hitch for good draft load distribution along the frame. Suitcase-type weights can be conveniently supported on the beam structure in an accommodation space defined by the rearward portion of the frame. The gang support arrangement including the spring brackets provides a relatively even down pressure on the disk or coulter gangs to provide uniform trash sizing in differing terrain and soil conditions. The constant down pressure together with the ability of an individual gang assembly to trip independently of the remainder of the gangs advantageously maintain a relatively constant down pressure for the earth-working tools, even when additional weights are added. Disks or coulters can move upwardly over relatively large obstacles and are less likely to break. Disk scrapers are supported by the gang tube rather than by an individual scraper support bar so that the distance the gangs can trip is increased by eliminating the interference that existed between the frame and support bar with at least some of the previous implements.

The present design permits use of either angled disk gangs or straight blade coulter gangs of numerous different widths utilizing the same depth control, main frame and hitch components. The main frame structure easily accepts folding outrigger sections so that relatively wide implements can be manufactured. In a folding implement where more than one angled disk gang assembly is utilized on a flexible pivoting outrigger frame, the gangs are angled in opposite directions to balance side forces.

These and other objects, features and advantages of the present invention will become apparent from the detailed description below when taken with the accompanying drawings.

BRIEF DESCRIPTION OF THE DRAWINGS

FIG. 1 is a top view of an implement embodying the principles of the present invention.

FIG. 5 is a side view of the coulter gang assembly of FIG. 4.

FIG. 13 is a top view of an implement similar to that of FIG. 12 but having a narrower outer coulter gang assembly supported by two rather than three spring bracket assemblies.

FIG. 14 is a perspective view of a portion of the rear section of the implement of FIG. 1 showing the heavy-duty spring trip standard assembly with a concave twisted shovel in the soil-working position.

FIG. 15 is a view of the suitcase weights taken along lines 15—15 of FIG. 1.

DESCRIPTION OF THE PREFERRED EMBODIMENT

Figure 3:
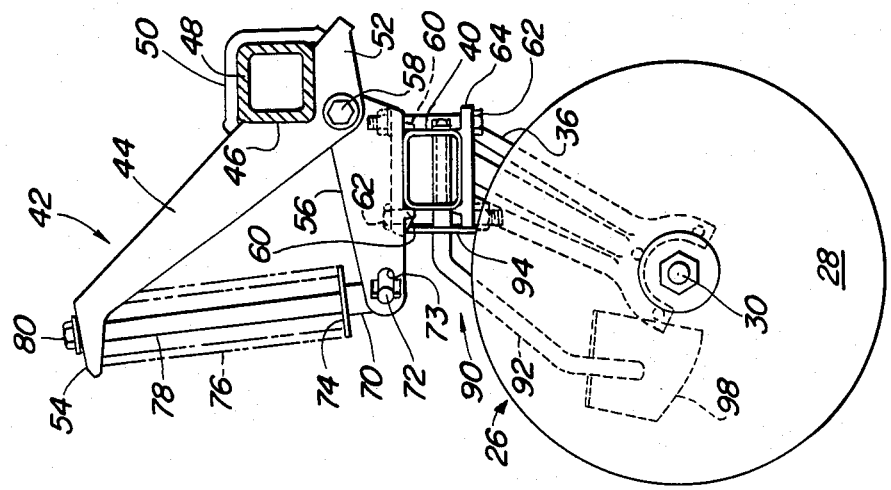
FIG. 3 is a side elevation of the disk gang assembly of FIG. 2.

Referring to FIG. 1, therein is shown a tillage implement 10 having a rigid, generally rectangularly shaped main frame 12 supported for forward movement over a field by vertically adjustable wheel assemblies 14. A hitch assembly 16 is connected to the forward portion of the main frame 12 and includes a forward towing connection 18 adapted for connecting to a tractor or other towing vehicle. The forward portion of the main frame 12 supports a plurality of transversely spaced trash-sizing gang assemblies 20 for chopping or cutting stubble, crops or crop residue. The rearward portion of the main frame 12 supports a plurality of earth-working tools indicated generally at 22 for penetrating the soil and for lifting the soil to partially cover the material cut by the gangs 20. The earth-working tools 22 are preferably deep tillage tools such as chisel plow shovels which typically penetrate at least six to twelve inches below the surface of the soil.

Figure 2:
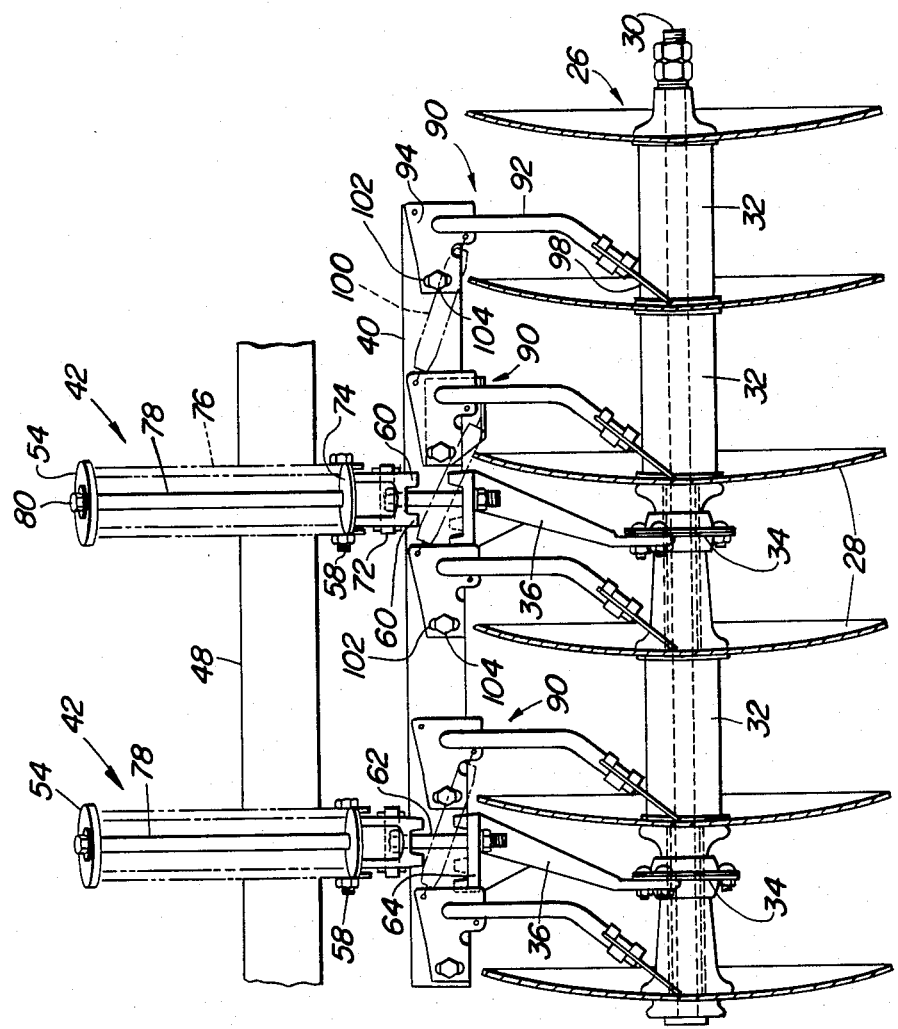
FIG. 2 is a rear view partially in section of a disk gang assembly.

The trash-sizing gang assemblies 20 preferably include disk gangs 26 (FIGS. 1–3) having a plurality of cup-shaped disks 28. In the preferred embodiment, at least four disks but no more than nine disks are transversely supported on a gang bolt 30 with spacers 32 maintaining the desired separation between the disks. The gang 26 is rotatably mounted by disk bearings 34 located at the lower ends of arms or standards 36 which depend from a rectangular gang tube 40. The gang tube 40 in turn is supported from the forward portion of the main frame 12 by a plurality of spring bracket assemblies 42 which permit the gang 26 to rock rearwardly and upwardly relative to the frame 12 over a range of heights while maintaining a constant down pressure of the gangs 26 against the soil when the frame is in the soil-working position.

The spring bracket assembly 42 includes a rearwardly opening channel-shaped main bracket 44 having a forward right-angle notch 46 which is received against a rectangular tube 48 connected to the main frame 12. A U-bolt 50 is tightened against the tube 48 and the main bracket 44 to secure the bracket in the desired location. The bracket 44 has a lower portion 52 which extends below the main frame 12. The bracket 44 extends rearwardly and upwardly from the tube 48 to an apertured spring-abutting surface 54 which is angled downwardly and forwardly. A fore-and-aft extending pivot bracket 56 is connected at its forward end by a transverse pivot 58 to the lower portion 52 of the main bracket 44. The lower portion of the bracket 56 includes downwardly-protruding ears 60, which as best seen in FIG. 3, receive the top portion of the gang tube 40. A pair of connecting bolts 62 extend downwardly between each pair of ears 60 adjacent opposite faces of the gang tube 40. The bolts 62 pass through a plate 64 located on the upper end of the standard 36. The bolts 62 are tightened to draw the plate 64 against the generally horizontal bottom surface of the gang tube 40 and to secure the top portion of the gang tube against the bottom of the pivot bracket 56. The gang tube 40 is located below and behind the pivot 58, and, as the pivot bracket 56 rocks upwardly, the gang tube 40 will rock rearwardly and upwardly.

The pivot bracket 56 extends rearwardly from the area of connection with the gang tube 40 to a connection with a spring-retaining pivot 70. The pivot 70 includes a pivot pin 72 extending transversely outwardly through apertures 73 in the opposite sides of the pivot bracket 56. The pivot 70 also includes an upwardly directed, spring-abutting surface 74. A coil spring 76 is compressed between the spring-abutting surfaces 54 and 74, and a tension link or bolt 78 is inserted through the aperture in the surface 54 and is threaded into the spring-retaining pivot 70. The bolt 78 includes a head or upper enlarged surface 80 which prevents the bolt from sliding downwardly through the aperture in the surface 54. The bolt 78 maintains the spring 76 in a compressed condition and limits the downward pivoting of the bracket 56. In the embodiment shown in FIG. 3, the aperture 73 is slotted so that the spring-retaining pivot 70 can be moved to change the effective moment arm through which the spring 76 acts to bias the pivot bracket 56 downwardly to force the gang 26 against the soil. The pin 72 is located slightly below the pivot 58 and forwardly of the spring-abutting surface 54, so that as the gang 26 trips upwardly, initially the moment arm through which the spring 76 acts ($M_1$ of FIG. 5) increases, and thereafter the moment arm decreases (towards $M_2$) as the pin 72 moves through an arc about the pivot 58 towards location 75. The effective moment arm through which the rearward and upward forces on the gang 26 act, coupled with the effective moment arm of the pivot bracket 56 through which the compressed spring 76 acts, cooperate with the weight of the disk gang assembly 20 to provide a generally constant down pressure as the gang 26 rocks between its lowermost position determined by the length of the tension link or bolt 78 and the uppermost position which in the preferred embodiment is approximately eight inches above the lowermost position. In the preferred embodiment, the average working range of the gang 26 is approximately centered between the uppermost and lowermost positions. Although the curve of gang down pressure versus rocked position of the gang is generally constant, the trip geometry provides a slight down pressure peak in the average working range.

Figure 4:
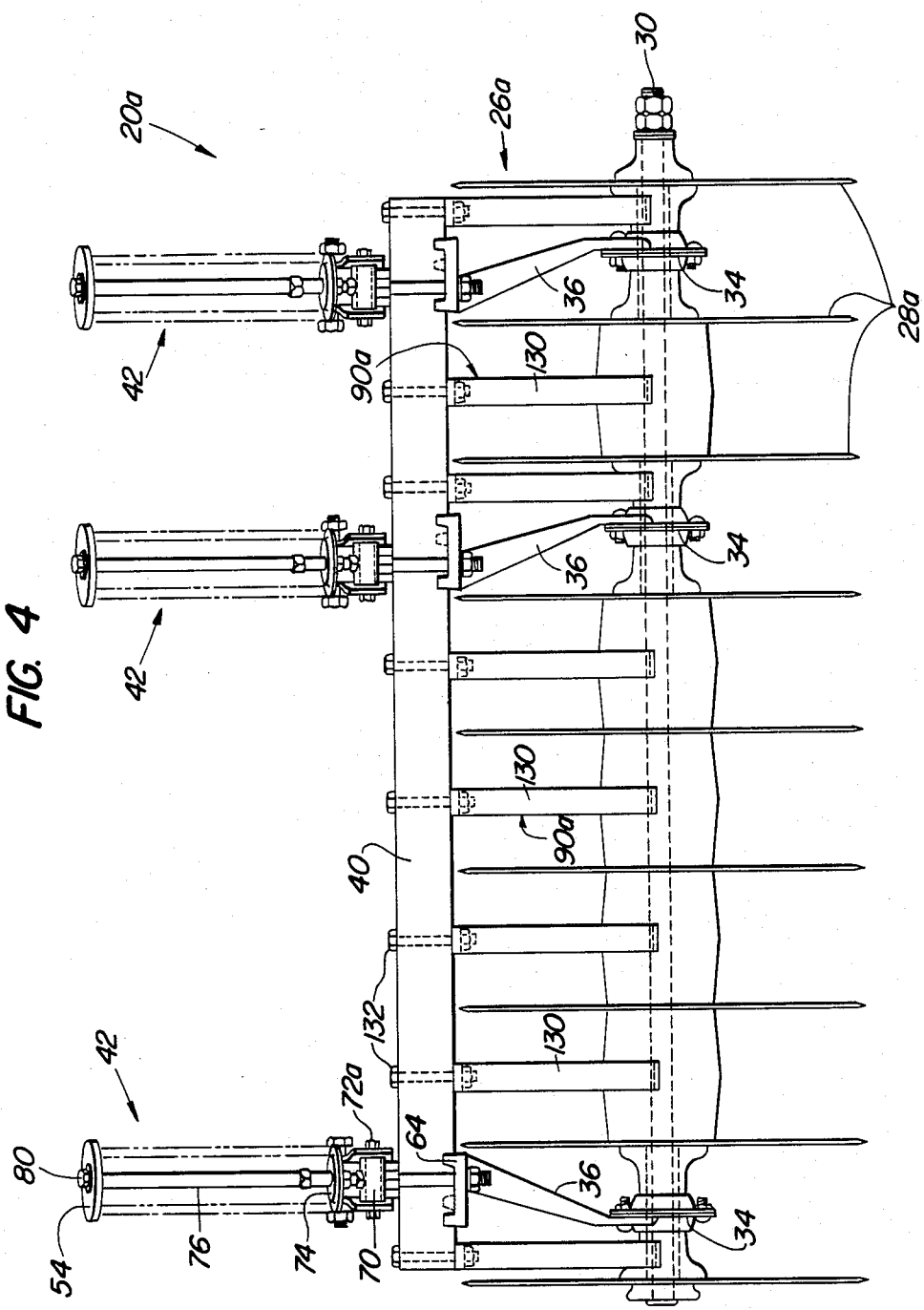
FIG. 4 is a rear view of a coulter gang assembly.
Figure 6:
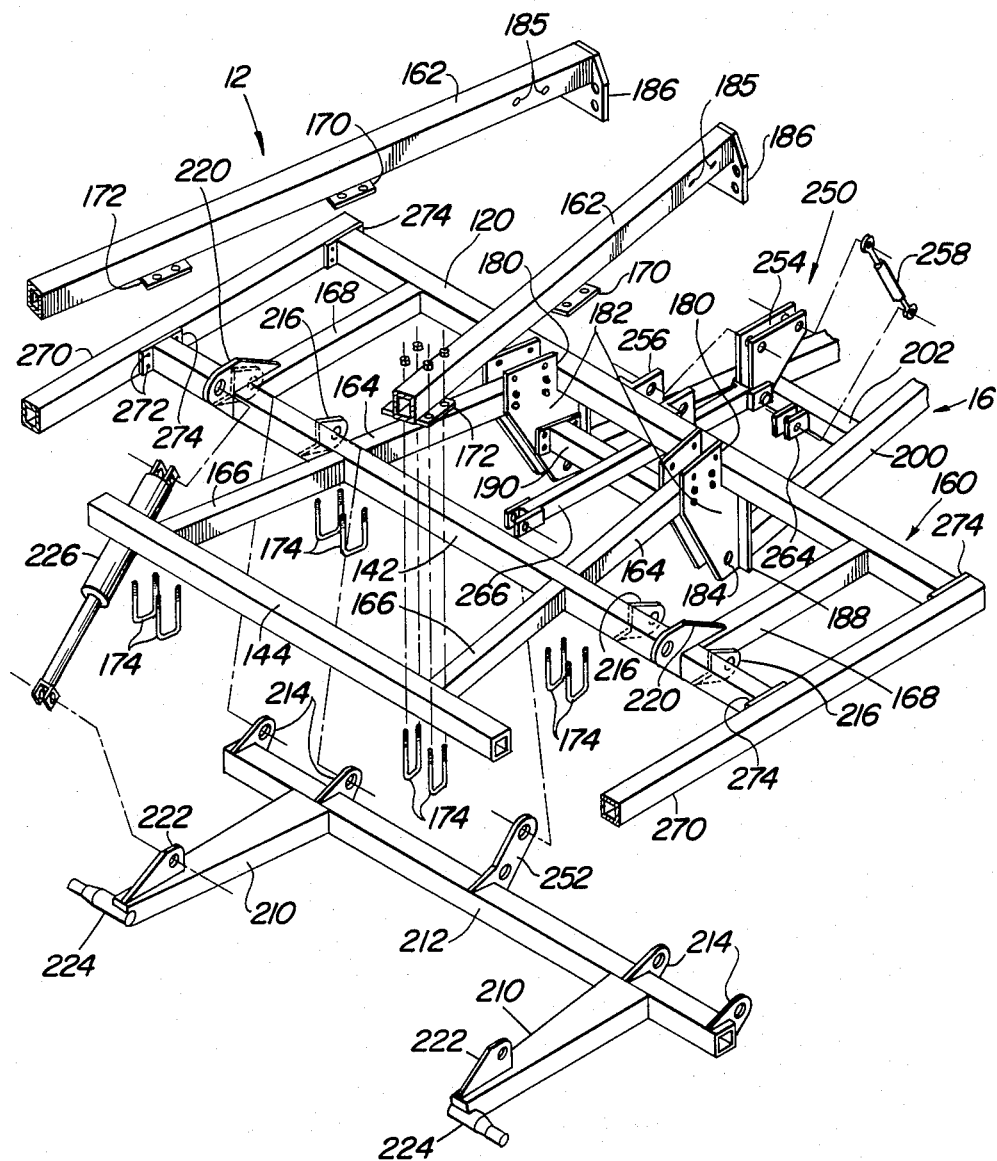
FIG. 6 is an exploded fragmentary view of the main frame and lift and leveling assemblies of the implement of FIG. 1.
Figure 7:
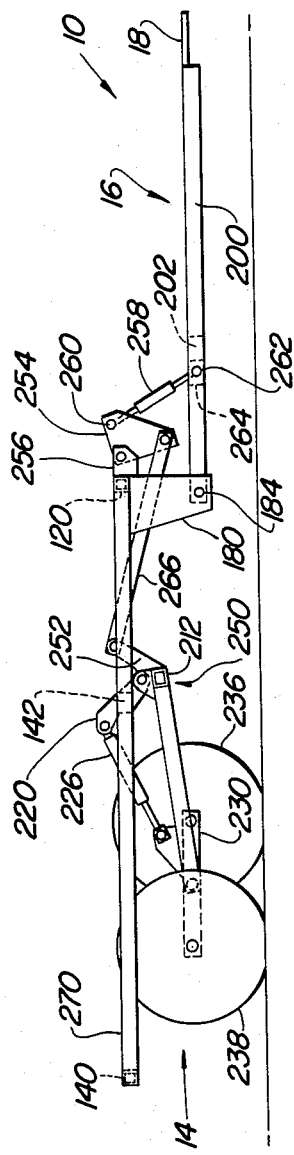
FIG. 7 is a side view of the lift assembly and leveling linkage for the implement of FIG. 1 with the frame in the field-working position.
Figure 8:
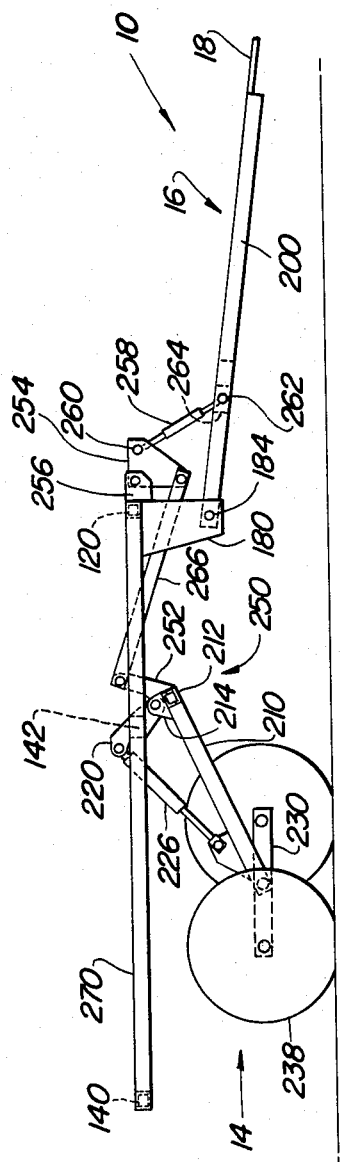
FIG. 8 is a view similar to FIG. 7 but showing the frame in the transport position.

At least two spring bracket assemblies 42 are utilized for each trash-cutting gang assembly 20. The gang tube 40 is rigid and evenly distributes the torque acting thereon between the pivot brackets 56. For longer gangs 26 which include up to nine blades 28, (FIGS. 4 and 12) three spring bracket assemblies 42 are utilized. Down pressure is adjusted by changing the location of the pivot 72 in the slot 73 (FIG. 3), or by providing a plurality of springs 76 with different spring rates and selecting the spring to achieve the desired bias.

A plurality of scraper assemblies 90 are supported directly on the gang tube 40 to thereby eliminate the need for a separate scraper mounting bar or angle which would interfere with the frame and limit the trip height of the gang 26. Each scraper assembly 90 includes a scraper arm 92 pivotally connected to the front and rear faces of the gang tube 40. A plate 94 is connected for rocking with the arm 92 at a location offset rearwardly from the pivotal connection of the arm with the rear face. The arm 92 extends downwardly to a lower end which supports a scraper blade 98 adjacent the inside concave surface of the disk blade 28. A spring 100 is tensioned between opposite corners of adjacent plates 94 to bias the scraper blades 98 toward the corresponding disk blades 28. The plates 94 are slotted at 102, and bolts 104 inserted through the slots and into the gang tube 40 limit the angle through which the arms 92 pivot.

In the embodiment shown in FIG. 1, the tubes 48 to which the spring bracket assemblies 42 are attached are part of stub-bar structure 110. The stub-bars 110 are connected to the main frame 12 at an acute angle with respect to the transverse direction to thereby angle the gang tube 40 and the gang 26 with respect to the transverse direction. Preferably the acute angle is approximately fourteen degrees. The stub-bars 110 are welded to mounting plates 114 which in turn are bolted to opposite sides of fore-and-aft extending portions of the main frame 12. The ends of the stub-bars 110 corresponding to the trailing portion of the gang assemblies 20 are reinforced with L-shaped brackets 116 connected between the stub-bar end and a first transverse beam 120 which extends substantially across the width of the implement. In an alternate embodiment (FIGS. 4, 5, 12 and 13) the gang assemblies 20a have coulter gangs 26a rather than disk gangs. The gangs 26a each include from three to nine coulter blades 28a. The gang assemblies 20a are supported from the forward portion of the main frame 12 with the axes of rotation of the coulter blades 28a extending substantially parallel to the transverse direction. The support arrangement for the coulter gang assemblies is generally identical to that described for the disk gang assemblies 20 and so will not be discussed in detail. The scraper assemblies 90a for the coulter gangs 26a include L-shaped straps 130 connected to the gang tube 40 by bolts 132. The straps 130 are centrally positioned between pairs of coulters 28a to prevent dirt buildup.

The earth-working tools 22 are transversely spaced on a second transverse beam 140 which forms the rear of the main frame 12, and on third and fourth transverse beams 142 and 144, respectively, located between the beams 120 and 140. Additional tools 22 may be connected outwardly of the main frame 12 on extention or stub-frames 150 bolted to the main frame 12. In the preferred embodiment, the earth-working tools 22 include concave twisted chisel plow shovels 151 (FIG. 14) having a forwardly concave soil-directing path extending substantially the entire length of the shovel. For a more detailed description of the shovels 151, reference may be had to U.S. Pat. No. 4,275,792, issued June 30, 1981 and assigned to the assignee of the present invention, incorporated herein by reference. The twisted shovel 151 is supported at the lower end of a spring trip standard assembly 152 and includes a tip 153. The standard assemblies 152 are connected to the main frame 12 by U-bolts 154. The assembly 152 includes a standard 156 pivotally connected to a main bracket 158 and biased downwardly by a spring arrangement 159. In the preferred embodiment the standard assembly 152 has a high initial trip force level of greater than 800 pounds and preferably approximately 1,200 pounds. The trip force increases as the standard 156 trips up over obstacles to an intermediate position. From the intermediate position to a maximum tripped position the trip force decreases to permit the standard to easily clear the obstacle.

For a more detailed description of the assembly 152, reference may be had to co-pending application Ser. No. 326,735, entitled "Spring Trip Standard Assembly" of J. David Long and Phillip E. Stevens, assigned to the assignee of the present invention and incorporated herein by reference. The tip 153 of the concave twisted shovel 151 includes a lowermost centrally located portion, which when the main frame 12 is in the soil-working position, is supported approximately six to twelve inches below the surface of the soil. The depth of penetration of the tool 151 can be varied by raising or lowering the frame 12 on the ground wheel assemblies 14 within a preselected range of heights above the surface of the ground. Since the main frame 12 is rigid, the front portion of the frame will raise and lower also, but the spring bracket assemblies 42 permit the gangs 20 to rock and remain in contact with the soil throughout the range. In the preferred embodiment the gangs 20 can flex up to eight inches above the preselected lowermost position and typically work in a range of two to ten inches above the depth of the tool 151. The trip curve of the spring trip standard assembly 152, wherein the ratio of the maximum trip force to the initial trip force is less than about 1.5 to 1, maintains the tip 153 of the tool 151 at the proper depth without needless tripping and yet permits the shank 156 to trip upwardly over fairly large obstacles when necessary. The weight of the implement 10 is properly balanced between the front and rear portions of the main frame 12 so that the down force on the earth-working tools 22 remains fairly constant even as the trash-sizing gang assemblies 20 rock up and down over rough terrain and obstacles.

The main frame 12, as best seen in FIGS. 1 and 6–8, includes a lower rigid weldment or subframe 160 (FIG. 6) and upper rearwardly diverging diagonal beam members 162. The weldment or subframe 160 includes the first, third and fourth transverse beams 120, 142 and 144, respectively, maintained in a spaced relationship by a pair of rearwardly diverging, interconnecting beams 164 extending between the first and third transverse beams 120 and 142, and by similar interconnecting beams 166 extending between the third and fourth transverse beams 142 and 144. An additional pair of fore-and-aft interconnecting beams 168 extend between the first and third transverse beams 120 and 142 transversely outwardly of the interconnecting beams 164. The diagonal beam members 162 extend parallel to and directly overlie the interconnecting beams 164 and 166. Front and rear brackets 170 and 172, respectively, are welded to the lower surface of the rectangular beam members 162, and, together with U-bolt assemblies 174 extending around the weldment 164 at the connections of the third and fourth transverse beams with the interconnecting beams 164 and 166, secure the beam members 162 in overlying fashion above the diagonal beams 164 and 166.

Hitch drops 180, including a pair of side plates 182, on either side of the forward portions of the interconnecting beams 164 and the diagonal beam members 162 extend downwardly and forwardly to lower pivots 184. Bolts are inserted through holes in the plates 182 and through holes 185 in the interconnecting beams 164 and diagonal beam members 162. Plates 186 welded to the front portions of the diagonal beam members 162 extend downwardly across the forward face of the transverse beam 120 and are bolted to an angle 188 forming the forward face of the hitch drops 180. A transverse reinforcing beam 190 is bolted to the inside plates 182 of the hitch drops 180 below the beam 120.

The hitch assembly 16 includes a pair of forwardly converging hitch beam members 200 connected to the frame 12 by the pivots 184 of the hitch drops 180 below the plane of the lower portion of the weldment 160. A transverse hitch reinforcing beam 202 is connected between the hitch beams 200 to form a generally A-shaped hitch structure with the towing connection 18 located at the apex on the fore-and-aft center line of the main frame 12.

The ground wheel assemblies 14 include wheel support arms 210 (FIG. 6) which extend downwardly and rearwardly from a rectangular tubular shaft 212 rockably connected by brackets 214 to mating brackets 216 welded to and extending forwardly from the third transverse beam 142 adjacent the beams 164 and 168. Cylinder anchors 220 are welded to the top of the beam 142 and to the tops of the beams 168. Cylinder brackets 222 are welded to the lower ends of the wheel support arms 210 adjacent wheel frame pivots 224. A pair of hydraulic cylinders 226 have their anchor ends connected to the cylinder anchors 220 and their rod ends connected to the cylinder brackets 222. The cylinders 226 are connected to a source of hydraulic fluid pressure on the towing vehicle for extending and retracting the rod to rock the wheel arms 210 and the shaft 212 to raise and lower the wheel frame pivots 224 with respect to the main frame 12. The wheel frame pivots 224 support a pair of tandem wheel support frames 230 (FIG. 1) which diverge outwardly from a forward position between the third and fourth transverse beams 142 and 144 to a rearward portion located rearwardly and outwardly of the fourth transverse beam 144. Front and rear wheels 236 and 238, respectively, are rotatably supported at the ends of the support frame 230. The wheels 236 and 238 can rock up and down with respect to each other about the frame pivot 224. The fourth transverse beam 144 terminates inwardly of the rear wheels 238. The second transverse beam 140 is supported behind the rear wheels 238 by end brackets 240 welded to and extending downwardly from the rear ends of the diagonal beam members 162. The top of the beam 140 is generally parallel to the bottom of the diagonal beam members 162 so that the transverse beams 120, 142, 144 and 140 lie in approximately the same horizontal plane.

To maintain the main frame 12 in a substantially level position as the frame is rocked up and down between the field-working and transport positions, a frame leveling system 250 (FIGS. 6-8) is operably connected between the rock shaft 212 and the hitch assembly 16. An arm 252 extends upwardly and forwardly from, and is connected for rocking with, the rock shaft 212. Pivot plate structure 254 is supported for rocking at the forward end of the main frame 12 by a bracket assembly 256 connected to the transverse beam 120. A turn buckle 258 is connected at one end to the upper front portion of the pivot plate 254 by a pin 260. The lower portion of the turn buckle is connected by a pin 262 to a bracket 264 extending rearwardly from the transverse beam 202. A connecting link 266 is pivotally connected to the upper end of the arm 252 and to the lower portion of the pivot plate 254 for rocking the latter up and down as the rock shaft 212 is rocked by extension and retraction of the hydraulic cylinders 226. As the shaft 212 is rocked to raise the frame 12, the arm 252 pulls the link 266 rearwardly and pivots the upper front portion of the plate 254 downwardly causing the turn buckle 258 to pivot the hitch assembly 16 downwardly about the pivots 184. As the frame 12 is lowered, the arm 252 moves the link 266 forwardly to pivot the upper front portion of the plate 254 upwardly and raise the hitch assembly 16 about the pivots 184. The hitch connection 18 is thereby maintained at a substantially constant height (FIGS. 7 and 8) above the ground regardless of the position of the frame 12. The turn buckle 258 can be adjusted to initially level the main frame 12. No other leveling adjustment is required for the tillage implement 10. Substantially all of the wheel lift and frame leveling structure is located below the top of the main frame 12.

As best seen in FIG. 1, the hitch beams 200 lie generally parallel to the axes of the diagonal beam members 162 to distribute draft forces along the backbone of the main frame 12 which includes the members 162 and the interconnecting beams 164 and 166 of the weldment 160. The diagonal beam members 162 provide substantial added frame strength without decreasing frame-to-ground clearance and without limiting the distance that the gang assemblies 20 can rock upwardly.

Figure 9:
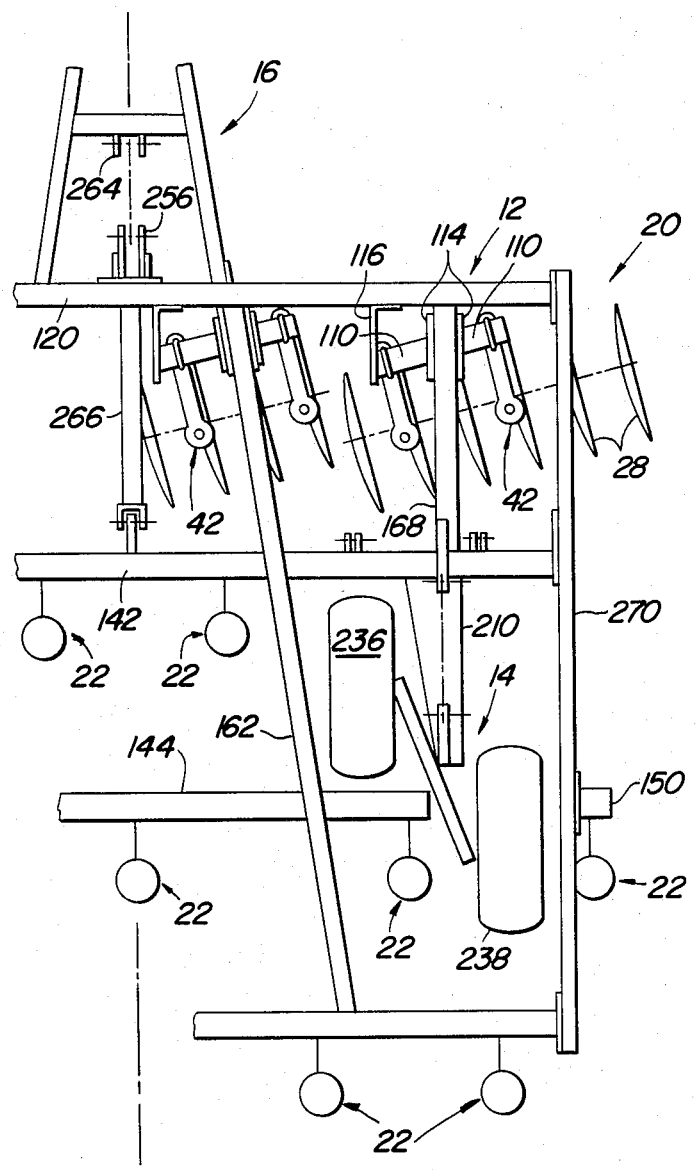
FIG. 9 is a top view of the right-hand portion of an implement similar to that shown in FIG. 1 but showing the frame outfitted with gangs for a narrower field-working width.

Fore-and-aft extending side frame members 270 are connected to the transverse beams 120, 142 and 140 by bolts 272 (FIGS. 6 and 14) extending through plates 274 welded to the ends of the beams. In the embodiment of FIG. 1, the stub-bars 110 for the outermost trash-sizing gang assemblies 20 are bolted to the side frame members 270. The extension frames 150 at the rear of the main frame 12 are also connected to the members 270. The stub-bars 110 for the innermost gang assemblies 20 are connected to the diagonal interconnecting beams 164 of the subframe 160. As shown in FIG. 1, a combination of a five-disk gang and a six-disk gang assembly is utilized on each half of the main frame 12, but different combinations of gang assembly widths may be attached to the frame to vary the effective working width. For example, FIG. 9 shows a four-disk and a six-disk gang assembly combination wherein the stub-bars 110 are connected to the fore-and-aft beam 168 to provide a narrower effective width than that of the implement shown in FIG. 1. The extension frame 150 for the configuration of FIG. 9 is single stub-bar which supports one earth-working tool 22 rearwardly of the outermost disks 28.

Figure 10:
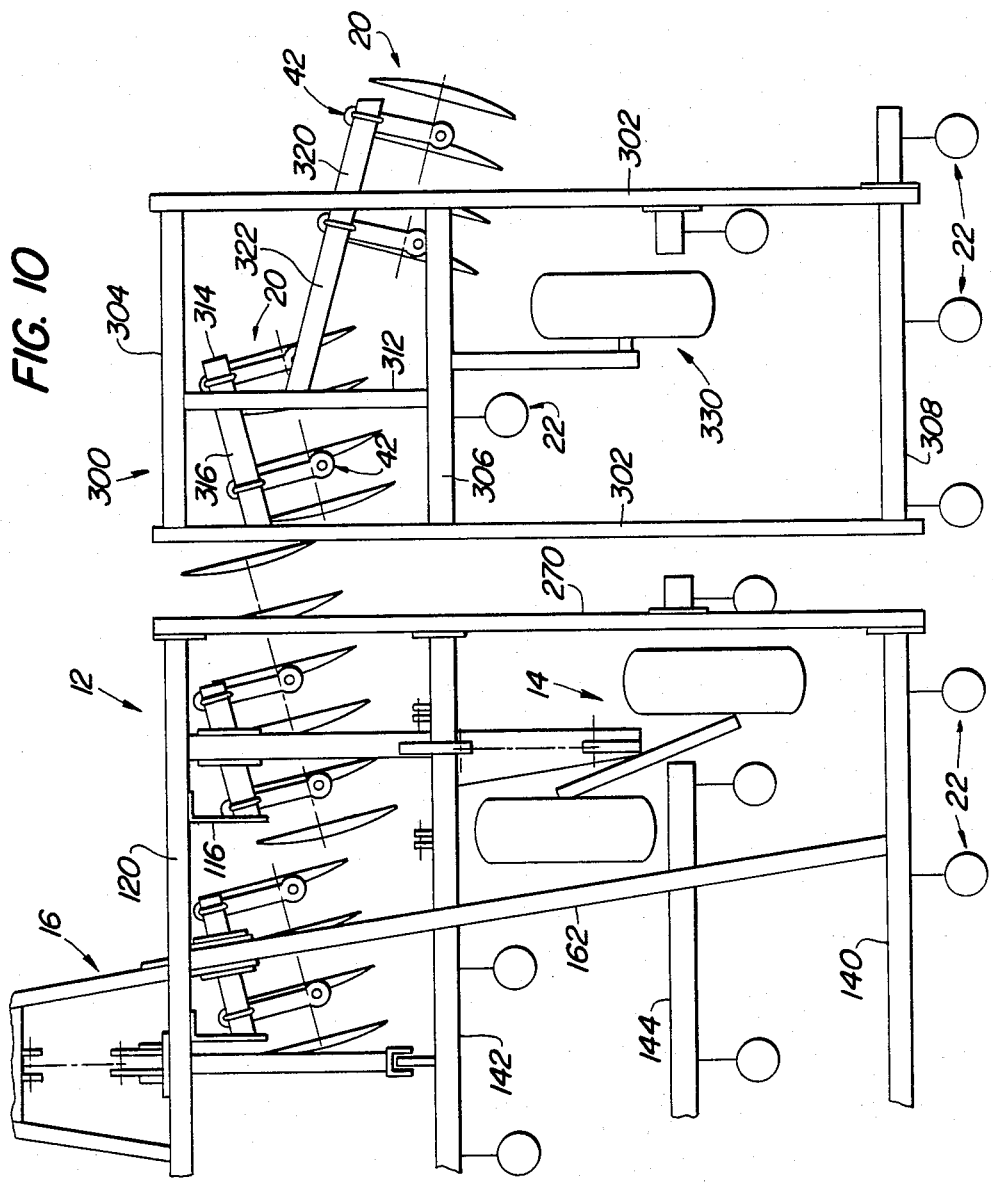
FIG. 10 is a view similar to FIG. 9 but showing an implement with a flexible pivoting outrigger section utilizing two disk gang assemblies offset at opposite acute angles with respect to the transverse direction to equalize side forces on the outrigger section.

FIG. 10 shows center frame structure similar to that shown in FIG. 9 but hingedly connecting an outrigger frame 300 which is connected for rocking with respect to the main frame 12 by conventional folding hinge structure (not shown). The outrigger frame 300 includes fore-and-aft extending side beams 302 connected by transverse beam members 304, 306 and 308 which are substantially aligned with the transverse beams 120, 142 and 140, respectively, of the main frame 12. A beam 312 extends in the fore-and-aft direction between the beams 304 and 306 and supports a stub-bar 314 and one end of a bar 316. The opposite end of the bar 316 is connected to the beam 302. A four-disk gang assembly 20 is connected to the bars 314 and 316 at an acute angle with respect to the transverse direction. Another four-disk gang assembly 20 is connected to stub-bar 320 and cross member 322 connected to the outer beam 302. To minimize side forces on the outrigger frame 300, the gangs 20 are angled at opposite angles with respect to the transverse direction. Preferably the angle that each disk gang assembly 22 forms with the transverse direction is approximately fourteen degrees.

The outrigger frame 300 includes a separate gauge wheel assembly 330 for maintaining the outrigger frame the desired distance above the surface of the ground.

Figure 11:
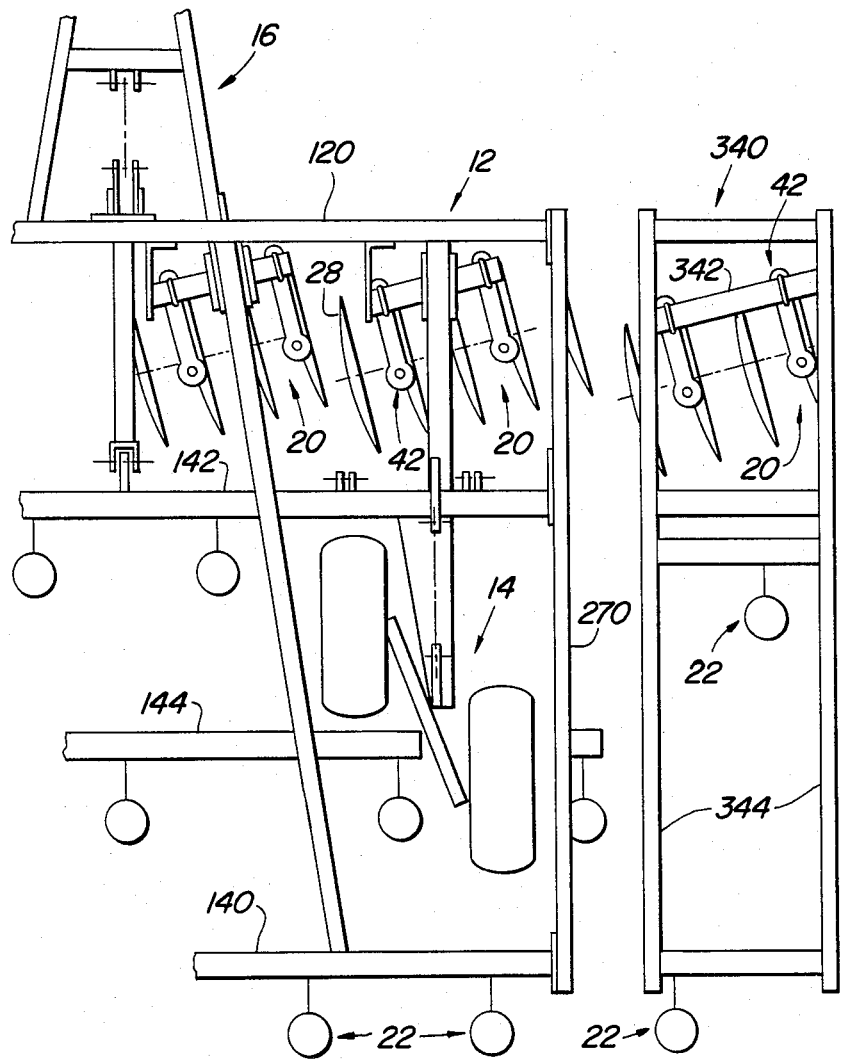
FIG. 11 is a top view of a portion of a folding implement with a rigid outrigger section.

In the embodiment shown in FIG. 11, an outrigger frame 340 is connected to the main frame 12 by a folding hinge (not shown). The folding hinge is locked to maintain the outrigger 340 level with the main frame 12 during field-working operations. A total of thirteen disks 28 are transversely spaced on the three gang assemblies 20. The outrigger gang assembly 20 is supported from a cross-member 342 connected between a pair of transversely spaced beams 344 generally parallel and equal in length to the frame member 270.

Figure 12:
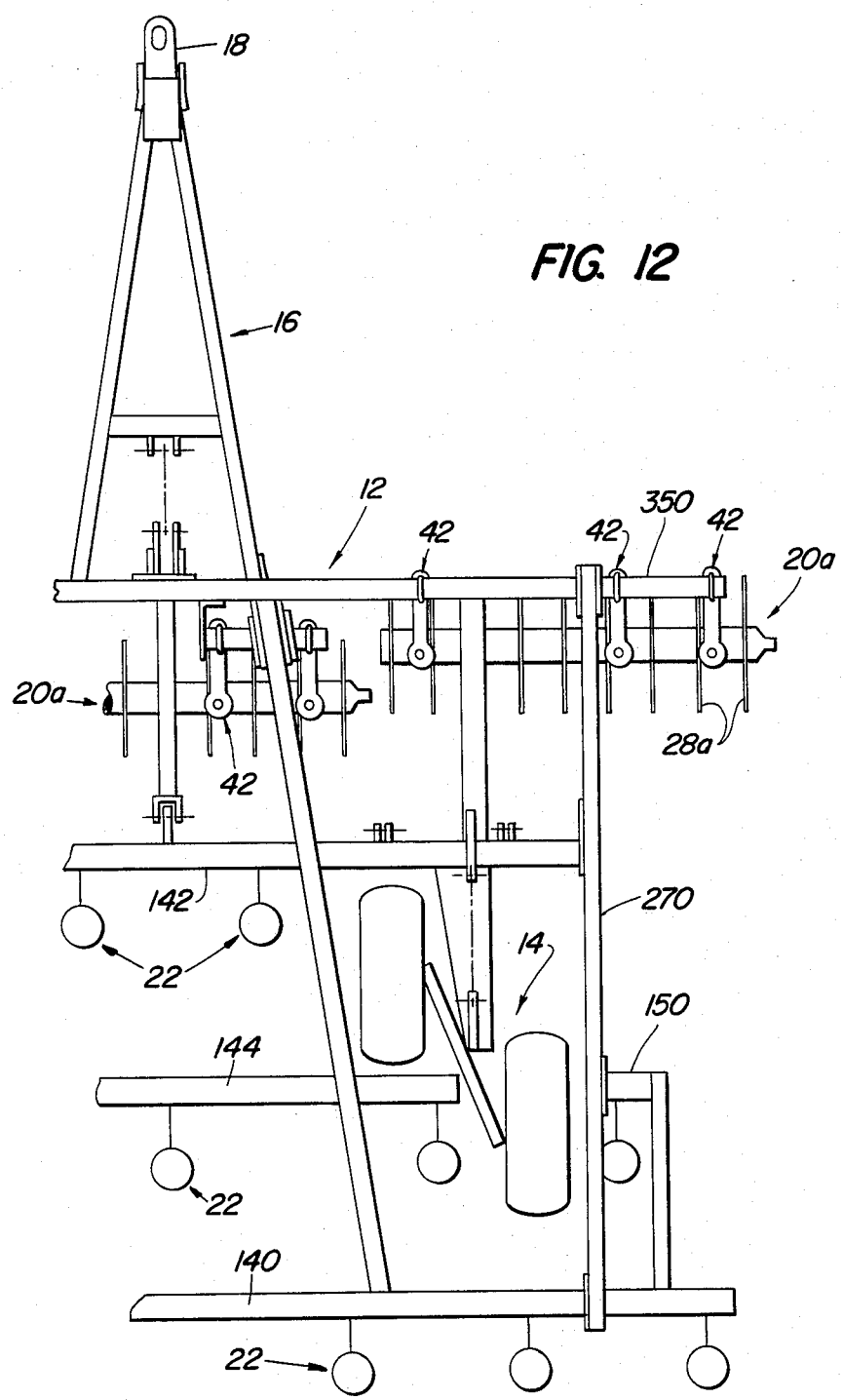
FIG. 12 is a top view of a portion of an implement similar to the implement of FIG. 1 but utilizing coulter gang assemblies.

In the embodiment shown in FIG. 12, nine-coulter gang assemblies 20a are supported from the main frame 12 and from a long stub-frame 350 connected to the beam 270. The embodiment of FIG. 12 exemplifies the use of three spring bracket assemblies 42 with a large gang assembly 20. FIG. 13 shows an implement similar to that shown in FIG. 12 but having a narrower effective field-working width with fewer coulters spaced across each half of the front portion of the frame 12. No extension frame or outer stub-bar is required for attaching the earth-working tools 22 in the configuration shown in FIG. 13.

It is apparent from FIGS. 1 and 9-13 that numerous field-working widths can be achieved utilizing different combinations of gang assembly widths. These embodiments are given by way of example only to show the versatility provided by the present invention and are not intended to limit the invention strictly to the configurations shown.

As best seen in FIG. 1 the trash-sizing gang assemblies 20 and the earth-working tools 22 are substantially symmetrically arranged with respect to the fore-and-aft center line of the implement 10. In the embodiment shown therein, two earth-working tools 22 extend rearwardly from the third beam 142 between the diagonal beam members 162, while only a single earth-working tool 22 is centrally located between the transverse beams 140 and 144 at the rear of the frame 12. A generally open accomodation space is therefore provided between the beams 140 and 144 inwardly of the beam members 162. The inwardmost pair of tools 22 supported on the rear beam 140 are spaced apart a distance substantially equal to the distance between the rear of the diagonal beam members 162 to provide convenient access to the space between the beams 162. Weights 350 can be selectively added to or removed from the rear portions of the beam members 162 to increase or decrease the down pressure on the individual tools 22. As best seen in FIG. 15, the weights 350 are suitcase-type tractor weights which are mounted directly on the beam members 162 and extend inwardly therefrom into the accommodation space. Because the central rear area of the implement 10 is relatively unencumbered with tools 22, the weights 350 can be easily added or removed for different soil conditions. The spring bracket assemblies 42 of the trash-sizing gang assemblies 20 maintain a generally constant down pressure of the gangs 26 against the soil independently of the number of weights 350 added to or removed from the main frame 12.

Having described the preferred embodiment, it will be apparent that modifications can be made without departing from the scope of the invention as defined in the accompanying claims.

I claim:

1. In a tillage implement having a transversely extending rigid main frame adapted for forward movement over the soil, a plurality of rearwardly located earth-working tools supported from the main frame, means for moving the frame vertically to vary the depth of penetration of the tools over a substantial preselected range, and a trash-sizing gang assembly supported forwardly of the earth-working tools comprising: a transversely extending gang tube, a standard having an upper end connected to the gang tube and a lower end extending generally downwardly and rearwardly from the gang tube, a gang of cutter blades rotatably mounted at the lower end of the standard, and bracket means rockably connecting the gang tube to the main frame for supporting the gang of cutter blades generally transverse to the forward direction and permitting the gang to rock vertically below the main frame over a working range of distance approximately equal to that of the preselected range, and wherein said bracket means includes a fore-and-aft extending arm member, a first pivot connecting the forward end of the member to the frame, an upwardly and rearwardly directed member fixed to the frame and including a downwardly and forwardly directed spring-abutting surface located rearwardly of and above the aft end of the arm member, a spring compressed between the spring-abutting surface and the aft end of the arm member and acting through a moment arm which decreases as the arm rocks upwardly to compress the spring for automatically maintaining a substantially constant down pressure of the gang against the soil as the gang rocks vertically over the entire working range.

2. The invention as set forth in claim 1 wherein the gang includes at least three transversely spaced cutter blades, the gang tube comprises a transversely extending rigid beam supporting at least two of said standards in transversely spaced relationship, and wherein said bracket means includes at least two of said arm members connected to the rigid beam adjacent the connections of the standards to said beam, wherein said gang tube is connected to the pivot brackets rearwardly of the first pivots for permitting the gang tube to rock vertically with respect to the main frame.

3. In a tillage implement having a transversely extending frame adapted for forward movement over the soil, a trash-sizing gang assembly, comprising: at least two transversely spaced and generally horizontally disposed fore-and-aft extending pivot brackets pivotally supported at their forward ends by the frame for rocking about a generally transverse first horizontal axis; a rigid support beam extending between, and connecting the brackets, said beam constraining the brackets for rocking in unison about the first axis; a plurality of upright standards connected at their upper ends for rocking with the beam, said standards extending downwardly from the beam to lower tool-receiving ends; a gang of trash-cutting tools supported at the lower end of the standards for rotation about a second axis generally parallel to and offset below and rearwardly of the first axis, said gang rockable with the standards between a lower position and an upper position substantially above the lower position; a spring bracket fixed to the main frame and extending upwardly to a spring-abutting surface located above the aft end of the pivot bracket, tension link means extending from the spring-abutting surface downwardly and forwardly to a pivotal connection with the aft end of the pivot bracket, said tension link means preventing the gang from rocking below the lower position; and coil spring means compressed between the aft end of the pivot bracket and spring-abutting surface, said spring means encircling the tension link means and acting through a moment arm which decreases as the pivot bracket rocks upwardly for maintaining a substantially constant gang down pressure against the soil as the gang rocks between the first and second positions.

4. The invention as set forth in claim 3 wherein the brackets support the rigid beam rearwardly of the first axis for rocking vertically with respect to the frame; and wherein the tension link means is pivotally connected to the bracket rearwardly of the beam at a position approximately level with or slightly below the level of the first axis.

5. The invention as set forth in claim 4 further comprising a plurality of scraper arm assemblies pivotally connected to the rigid beam for rocking therewith and with the gang about the first axis, said assemblies including scraping means extending into soil-cleaning relationship with the tools as they rotate.

6. The invention as set forth in claim 4 further including a spring-abutting surface supported by the frame rearwardly and above the first axis, and wherein said spring is compressed between said surface and the bracket.

7. The invention as set forth in claim 3 or 4 further comprising stub-bar means selectively connectible to the frame for supporting at least one of the brackets.

8. The invention as set forth in claim 7 wherein the stub-bar means includes elongated support structure having an axis extending at an acute angle to the transverse direction when said stub-bar means is connected to the frame for supporting the gang assemblies at said acute angle with respect to the transverse direction.

9. In a tillage implement having a transversely extended frame including a transverse toolbar adapted for forward movement over the soil, a trash-sizing gang assembly, comprising: a pair of main brackets, each said bracket including a lower portion and an upper spring-abutting portion, means for supporting the bracket at transversely spaced locations on the toolbar with the lower portion located adjacent the lower rear side of the toolbar and the spring-abutting surface located rearwardly of the toolbar and rearwardly and above the lower portion, a fore-and-aft extending pivot bracket, a pivot connecting the forward end of the bracket to the lower portion for rocking about a transverse axis, said bracket extending rearwardly from said pivot in a generally horizontal attitude to a rear portion located below and forwardly of the spring-abutting surface, and spring means compressed between the rear portion and the spring-abutting surface and extending downwardly and forwardly from said surface for biasing the pivot bracket downwardly, said spring means acting through a moment arm which decreases as the pivot bracket rocks upwardly about the pivot against the bias of the spring; tool-support means extending transversely between the pivot brackets and connected thereto for constraining the pivot brackets for rocking together in unison, axle support means supported by and connected for rocking with the tool-support means, a gang of trash-cutting blades connected to the axle support means for rotation about a generally transverse axis located below and slightly rearwardly of the rear portion of the pivot bracket, said gang rockable with the axle support means and tool-support means for vertical movement with respect to the frame within a range of soil-working positions, the upper and lower positions at said range varying by at least six inches; wherein said spring means acts through the moment arm to automatically bias the gang downwardly with generally constant pressure regardless of the rocked position of the gang within the range to maintain substantially constant trash-cutting characteristics.

10. The invention as set forth in claim 9 further including tension link means connected between the rear portion and the spring-abutting surface for limiting the downward rocking of the pivot brackets and thereby preventing the gang from rocking downwardly below the lower position of the range.

11. The invention as set forth in claim 9 further comprising a scraper assembly connected for rocking with the tool-support means and extending downwardly therefrom into a soil-cleaning relationship with the trash-cutting blades.

12. The invention as set forth in claim 9 further comprising means for selectively attaching a third pivot bracket to the frame, and means for biasing the third bracket downwardly against the tool-support means to increase the down pressure of the gang when said third bracket is attached.

13. The invention as set forth in claim 12 wherein the gang of trash-cutting blades includes a selectively variable number of cutting blades for varying the working width of the implement, and wherein the third bracket is selectively attachable to provide increased down pressure to maintain a generally uniform down pressure per blade.

14. The invention as set forth in claim 9 or 13 wherein the implement includes a flexible folding outrigger frame, said outrigger frame supporting two of said trash-sizing gang assemblies with said axles angled at opposite acute angles with respect to the transverse direction to minimize side forces on the outrigger frame.

15. In a soil tillage implement adapted for forward movement over the ground, a generally rectangularly shaped main frame with front and rear transverse tool-support structures fixed with respect to each other, a plurality of transversely spaced trash-sizing gang assemblies mounted for rotation about a gang axle and rockably carried by the front support structure including pivot means for permitting the individual gangs to independently rock up and down with respect to the frame about a horizontal axis located above the gang and forwardly of the gang axle to accommodate variations in distance between the frame and the surface of the soil and to permit the gangs to move over obstacles, down pressure compensating means for automatically maintaining a substantially constant gang down pressure as the gangs rock up and down with respect to the frame, and transversely spaced shank assemblies supported by the rear support structure rearwardly of the trash-sizing gangs, said shank assemblies including plow tools for working the soil at a depth within a range of working depths, said depth being dependent on the distance of the main frame above the surface of the soil, means for raising and lowering the frame to adjust the working depth of the plow tools over a substantial working depth range, wherein said pivot means permits the gangs to rock to a relatively constant trash-sizing, soil-engaging position while said main frame is raised and lowered to adjust the penetration of the plow tools within the entire said working depth range, said down pressure compensating means comprising a first bracket extending horizontally rearwardly of the pivot means above the gang and connected for rocking with the gang about the horizontal axis, a second bracket fixed to and extending rearwardly from the frame and including a downwardly directed spring-abutting surface located above the aft end of the first bracket, a spring compressed between the spring-abutting surface and second bracket and acting through a moment arm against the aft end of the second bracket radially outwardly of the horizontal axis, said moment arm decreasing with as the first bracket rocks upwardly from the horizontal to compress the spring for maintaining said constant down pressure on the gangs as said frame is raised and lowered to vary the working depth of the plow tools over the entire range.

16. The invention as set forth in claim 15 further comprising a plurality of weights, and means for supporting the weights on the main frame adjacent the rear tool-support structure to increase the down pressure on the plow tools, wherein said down pressure compensating means maintains substantially constant down pressure on the gangs independently of the number of weights supported on the main frame, and wherein the shank assemblies comprise relatively rigid deep tillage tools.

17. The invention as set forth in claim 15 or 16 wherein the plow tool comprises a twisted shovel, said shovel having a major upright axis and a minor transverse axis, said shovel being bent forwardly about both axes to present a forwardly concave surface to direct soil and sized trash around the major axis.

18. The invention as set forth in claim 17 wherein said shovel includes a lowermost soil-engaging tip which, when the plow tools are operating in the soil-working range, extends substantially deeper into the soil than the trash-sizing gangs.

19. The invention as set forth in claim 18 wherein the working depth range of the plow tools is between approximately six and twelve inches, and the down pressure provided by said spring means maintains the trash-sizing gang penetration at approximately two to four inches.

20. The invention as set forth in claim 19 wherein said pivot means permits the individual gangs to rock up and down at least approximately eight inches.

21. The invention as set forth in claim 15 or 16 wherein the main frame includes a pair of generally fore-and-aft extending beams extending between the front and rear tool supports, said beams diverging transversely outwardly in the rearward direction, said beams defining with the rear tool support a substantially open area and including weight-support structure for supporting weights generally within the open area between the beams.

22. The invention as set forth in claim 21 further comprising a generally A-shaped hitch including forward connector means for attaching the implement to a towing vehicle, a pair of sidelegs diverging rearwardly from the connector means to a rearward connection with a forward portion of the main frame adjacent the front ends of the beams, wherein each sideleg lies generally parallel to the axis of the corresponding beam.

23. The invention as set forth in claim 15 wherein said front support structure includes means for selectively carrying the gang assemblies in either a first configuration wherein the axes of the gangs are parallel to the transverse direction, or a second configuration wherein the axes of the gangs are offset at an acute angle to the transverse direction.

24. The invention as set forth in claim 15 or 23 wherein the front transverse tool-support structure comprises a plurality of transversely spaced stub-frames, each stub-frame forming an acute angle with the transverse direction and supporting a disk gang assembly having a disk gang mounted for rotation about an axis parallel to said stub-frame.

25. The invention as set forth in claim 15 or 23 wherein the front transverse tool-support structure comprises a front transverse beam, said transverse beam supporting a plurality of coulter gang assemblies having coulter gangs with axes of rotation parallel to said beam.

26. The invention as set forth in claim 15 or 23 further comprising side frame extension means for supporting at least a portion of one gang assembly outwardly of the main frame.

27. The invention as set forth in claim 15 or 16 wherein the trash-sizing gang assembly includes a transverse gang tube connected for rocking vertically with respect to the front tool-support structure by the pivot means, a pair of transversely spaced arms extending downwardly and rearwardly from the gang tube, and a tool-supporting axle journalled for rotation at the lower ends of the arms, wherein said spring means acts through an effective moment arm to bias the gang tube downwardly, said moment arm changing as the gang tube pivots for effecting said constant down pressure.

28. The invention as set forth in claim 27 wherein the pivot means comprises a fore-and-aft extending pivot bracket, pin means pivotally connecting the forward end of the bracket for rocking about a generally transverse axis below and behind the tool-support structure, and means for connecting the gang tube to the bracket rearwardly of said transverse axis.

29. The invention as set forth in claim 28 further comprising a main bracket connected to the tool-support structure and having a lower end for receiving the pin means and an upper end located rearwardly and above the gang tube, and wherein said spring means comprises a coil spring extending downwardly and forwardly from the upper end to the aft end of the pivot bracket.

30. A tillage implement, comprising: a substantially rigid and rectangularly shaped main frame, said main frame including a forward portion having a transverse first beam, a rearward portion having a second beam generally parallel to the first beam, fore-and-aft connecting structure extending between the first and second beams, a third transverse beam supported by the connecting structure between the first and second beams, and first and second diagonal beams transversely offset on either side of the fore-and-aft center line of the main frame, said diagonal beams connected to, and extending rearwardly from the first beam in diverging fashion, said diagonal beams also extending above and connected to the second and third beams; a pair of frame-carrying wheel assemblies rockably supported by the main frame between the first and second beams; hitch means for connecting the main frame to a towing vehicle for forward movement over the ground, said hitch means comprising a pair of forwardly converging hitch beams and means connecting the hitch beams at their rearward ends to the forward portion of the main frame adjacent the connections of the respective diagonal beams to the first beam for tranferring draft forces directly between said hitch beams and said diagonal beams; a plurality of transversely spaced trash-sizing gangs supported by the forward portion of the frame for independent relative vertical movement with respect to the main frame; a plurality of deep-tillage tools supported by the rearward portion of the frame a preselected distance below the frame behind the trash-sizing gangs; lift means for rocking the wheel assemblies to raise and lower the main frame between a transport position wherein the sizing gangs and earth-working tools are supported above the ground, and a selectively variable ground-working position wherein the tools penetrate the surface of the ground, said ground-working position variable between an uppermost position wherein the tools penetrate the soil a first distance and a lowermost position at least six inches below the uppermost position; means for maintaining the main frame level as the ground-working position is varied; and wherein the trash-sizing gang assemblies include a fore-and-aft extending pivot bracket pivotally connected at its forward end to the frame for permitting the gang to rock vertically with respect to the frame between a first position wherein the gang penetrates the ground when the frame is in the uppermost ground-working position, and a second position, substantially lower than the first position, wherein the gang penetrates the soil when the frame is in the uppermost ground-working position, an upwardly and rearwardly directed member fixed to the frame and including a downwardly and forwardly directed spring-abutting surface located rearwardly and above the aft end of the pivot bracket, a spring compressed between the spring-abutting surface and the aft end of the pivot bracket and acting through a moment arm which decreases as the bracket rocks upwardly to compress the spring for automatically biasing the gang downwardly with generally constant pressure against the ground as the frame is moved vertically between the uppermost and lowermost positions.

31. The invention as set forth in claim 30 further comprising a plurality of weights, and means for supporting the weights on the diagonal beam structure adjacent the rearward portion of the frame.

32. The invention as set forth in claim 30 wherein said main frame further comprises a fore-and-aft frame section connecting said first and third beams, said frame section and said first and third beams defining a single rigid frame subassembly, said main frame also comprising first bracket means for releasably connecting the diagonal beams to the rigid frame subassembly.

33. The invention as set forth in claim 32 further comprising second bracket means for releasably connecting the second beam to the aft ends of the diagonal beams.

34. The invention as set forth in claim 32 wherein the rigid frame subassembly further comprises a fourth transverse beam, and a means for supporting said fourth beam rearwardly of the third beam wherein said fourth beam has a transverse length substantially less than said third and second beams, and wherein said wheel assemblies are supported between the third and second beams generally outwardly of the ends of the fourth beam.

35. The invention as set forth in claim 32 or 34 wherein the rigid frame subassembly comprises diagonal interconnecting members extending between the transverse beams, wherein the diagonal beams overlie and are approximately aligned with said diagonal connecting members.

36. The invention as set forth in claim 31 or 34 wherein the wheel assemblies are pivotally connected to the third beam generally rearwardly and below the rigid frame subassembly.

37. The invention as set forth in claim 31 or 32 wherein the diagonal beams overlie the first and third beams, and the means connecting the hitch beams includes a pair of hitch brackets connected to and extending downwardly from the fore ends of the respective diagonal beams, said means connecting also including pivot means connecting the hitch beams to the respective hitch brackets for permitting the hitch means to rock vertically.

38. The invention as set forth in claim 37 further comprising link means extending generally below the diagonal beams and operably connected to the lift means and the hitch means for rocking the latter up and down as the lift means rocks the wheel assemblies to lower and raise respectively the main frame to maintain said main frame in a substantially level attitude in both the transport and ground-working positions.

39. The invention as set forth in claim 31 or 32 further comprising a plurality of weights selectively attachable to the main frame, and wherein said main frame defines a substantially open rear area between the second and third beams and inwardly of the diagonal beams, wherein said open rear area is substantially devoid of earth-working tools, said weights when attached to the frame extending into said open area.

40. The invention as set forth in claim 39 wherein the weights are selectively attachable to the rear portions of the diagonal beams, said weights having a substantial portion extending above the lowermost portion of the main frame.

41. The invention as set forth in claim 40 wherein a substantial portion of the rearward portion of the main frame is unencumbered with earth-working tools between the diagonal beams and along the second beam to provide convenient access to the weight-receiving portions of said diagonal beams.

42. The invention as set forth in claim 31 or 32 further comprising spring bracket means for maintaining substantially constant down pressure of the individual gangs against the soil as the gangs move over obstacles and as the main frame moves vertically with respect to the surface of the ground over a range of heights corresponding to a range of selectable ground-working positions, thereby permitting the gangs to maintain substantially constant trash-cutting characteristics independently of the main frame height.

43. The invention as set forth in claim 42 further comprising a plurality of spring trip standard assemblies supporting the earth-working tools and transversely spaced on the second and third transverse beams, said assemblies having a high initial trip force which increases as the shank trips between a soil-working position and an intermediate tripped position, wherein the trip force decreases as the shank trips from the intermediate position to a fully tripped position.

44. The invention as set forth in claim 42 or 43 wherein the earth-working tools comprise a twisted shovel having a forwardly concave front soil-directing path and including a lowermost centrally located tip, which when the main frame is in the ground-working position, penetrates the ground to a depth substantially below the depth of penetration of the gangs.

45. The invention as set forth in claim 30 wherein the deep-tillage plow tools comprise a shank, and a forwardly concave twisted shovel connected to the shank for directing trash towards one side of the shank.

* * * * *

UNITED STATES PATENT AND TRADEMARK OFFICE
CERTIFICATE OF CORRECTION

PATENT NO. : 4,492,272
DATED : 8 January 1985
INVENTOR(S) : Thomas Carl Jensen

It is certified that error appears in the above-identified patent and that said Letters Patent is hereby corrected as shown below:

Column 14, line 47, delete "with".

Signed and Sealed this

Fifteenth Day of October 1985

[SEAL]

Attest:

Attesting Officer

DONALD J. QUIGG

Commissioner of Patents and Trademarks—Designate